US012742641B1

(12) United States Patent
Hammond

(10) Patent No.: US 12,742,641 B1
(45) Date of Patent: Sep. 22, 2026

(54) LEVELING DEVICE WITH HOOK AND LOOP STRAPS

(71) Applicant: James Hammond, Chambersburg, PA (US)

(72) Inventor: James Hammond, Chambersburg, PA (US)

( * ) Notice: Subject to any disclaimer, the term of this patent is extended or adjusted under 35 U.S.C. 154(b) by 317 days.

(21) Appl. No.: 18/424,067

(22) Filed: Jan. 26, 2024

(51) Int. Cl.
*G01C 9/28* (2006.01)

(52) U.S. Cl.
CPC .................................... *G01C 9/28* (2013.01)

(58) Field of Classification Search
CPC ....................................................... G01C 9/28
See application file for complete search history.

(56) References Cited

U.S. PATENT DOCUMENTS 3,707,772 A * 1/1973 Cotter ...................... G01C 9/16 33/395
4,295,279 A * 10/1981 Sienknecht .......... B25H 1/0085 227/156
4,663,856 A * 5/1987 Hall ......................... G01C 9/28 D10/69
4,829,676 A * 5/1989 Waldron .................. G01C 9/28 33/372
5,063,679 A * 11/1991 Schwandt ............... B25F 5/023 33/388
5,421,094 A * 6/1995 McCord ................... G01C 9/28 33/388
5,560,116 A * 10/1996 Tobia ....................... G01C 9/28 33/561.2
6,029,359 A * 2/2000 Szumer .................... G01C 9/28 33/465
6,332,277 B1 * 12/2001 Owoc ...................... G01C 9/28 33/373
6,502,322 B2 * 1/2003 Smochek ................ G01C 9/26 33/373
6,834,435 B2 * 12/2004 Turner ..................... G01C 9/28 33/529
7,644,506 B2 * 1/2010 Wong ....................... G01C 9/28 33/373
7,775,899 B1 * 8/2010 Cannon ............. A63B 69/3632 473/226
9,068,827 B2 * 6/2015 Webb ....................... G01C 9/28
9,234,751 B2 * 1/2016 Silberberg ............... G01C 9/28
9,546,867 B2 * 1/2017 Lueck ...................... G01C 9/26
9,926,722 B2 * 3/2018 Corgat .................. E04H 17/263
11,415,413 B2 * 8/2022 Cook ....................... G01C 9/34

(Continued)

FOREIGN PATENT DOCUMENTS

FR 2875596 A1 * 3/2006 ......... E04G 21/1808

*Primary Examiner* — Yaritza Guadalupe-Mccall
(74) *Attorney, Agent, or Firm* — Sanchelima & Associates, P.A.; Christian Sanchelima; Jesus Sanchelima

(57) ABSTRACT

A leveling device includes an elongated torpedo level body with embedded, aligned spirit levels visible on both sides. A fastening assembly attaches the device to pipes and conduits during installation. The assembly has a central hook and loop strap attached to one body surface and an oval loop on the opposite surface. The strap feeds through the loop to secure the device without twisting. Multiple strap assemblies can attach in parallel. The bottom surface has a magnet strip conforming to the base for stability on ferrous surfaces. The fastening assembly temporarily affixes the device to pipes and conduits.

5 Claims, 4 Drawing Sheets

(56) References Cited

U.S. PATENT DOCUMENTS

| | | | | |
|---|---|---|---|---|
| 2001/0034945 | A1* | 11/2001 | Smochek ................. | G01C 9/26 33/373 |
| 2006/0265891 | A1* | 11/2006 | Murphy ................... | G01C 9/28 33/379 |
| 2008/0060667 | A1* | 3/2008 | Bandonis ............... | A45D 24/36 132/214 |

* cited by examiner

LEVELING DEVICE WITH HOOK AND LOOP STRAPS

II. BACKGROUND OF THE INVENTION

1. Field of the Invention

The present invention relates to a leveling device and, more particularly, to a leveling device with hook and loop straps that allows for the temporary attachment of the device to pipes, conduits, and other cylindrical or curved structures during installation and alignment

2. Description of the Related Art

Several designs for leveling devices have been created previously. However, none of the prior designs incorporate adjustable hook and loop fastening straps that allow for easy temporary attachment to cylindrical or curved structures like pipes and conduits during installation and alignment. The hook and loop straps provide a quick and adaptable securing method without the need for tools or permanent modification.

Applicant believes that a related reference corresponds to U.S. patent publication No. 20060265891 published for Torpedo level for use with plastic pipe. The "891" reference discloses a torpedo level that is adapted for use with a non-metallic material such as PVC pipe by providing an attachment device for temporarily affixing the torpedo level in engaging relationship with the plastic pipe without any attendance. In one embodiment, the affixing device is an attachment strip extending along a planar side of the torpedo level and having an adhesive material on its outer side. A cover is adapted to protect the adhesive material when not in use. Another attachment device is a plurality of suction cups which are secured to the planar side and temporarily attachable to a plastic pipe. Another alternative is one or more Velcro straps which are attached to the body of the torpedo level by way of slots formed therein and which are selectably wrapped around a pipe for securing the torpedo level thereto.

Applicant believes that another related reference corresponds to U.S. Pat. No. 5,560,116 issued for a Flexible leveling device. The "116" reference is directed to a flexible leveling device for use on curved surfaces. The flexible leveling device comprises an elongated rectangular body having a longitudinal axis and being capable of at least 360° flexion about its longitudinal axis. A first spirit level is operatively connected to the elongated body. A holder preferably secures the spirit level to the elongated rectangular body, allowing the spirit level to remain substantially in position during flexion of the elongated body. The holder preferably comprises a first portion operatively connected to the rectangular body, with the spirit level operatively connected to the second portion of the holder. The elongated rectangular body preferably further comprises a first projection located near the first terminal edge, and a second projection located near the second terminal edge. The projections facilitate placement of the flexible leveling device. The flexible leveling device preferably further comprises a device to secure the rectangular body about a curved structure. In one embodiment, the securing device comprises an adjustable strap connectable between the first and the second projections to secure the rectangular body about the curved structure. In another embodiment, the elongated rectangular body comprises a first slot located near its first terminal edge and a second slot located near its second terminal edge. The securing device comprises an adjustable strap placeable within the first and the second slots to secure the rectangular body about the curved structure.

None of these references, however, teach of an elongated torpedo level with a plurality of embedded spirit levels and one or more hook and loop strap members which are used to temporarily attach the leveling device to pipes and conduits during installation.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a leveling device with enhanced stability and secure attachment through a fastening assembly comprising a central hook and loop strap on one body surface and an oval loop on the opposite surface. This configuration allows for the device to be affixed to non-ferromagnetic pipes and/or conduits during installation without the risk of twisting, ensuring precise measurements.

It is another object of this invention to provide a torpedo level including a hook and loop strap to wrap around the piping or other material to assist in holding the level in place for ease in installation when pipes or other materials are non magnetic.

It is still one of the objects of the present invention to provide a leveling device equipped with a magnet strip on the bottom surface, conforming to the base for stability on ferrous surfaces. This magnetic feature facilitates temporary affixation to ferromagnetic materials, enhancing the device's functionality and allowing for hands-free operation on magnetic surfaces.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
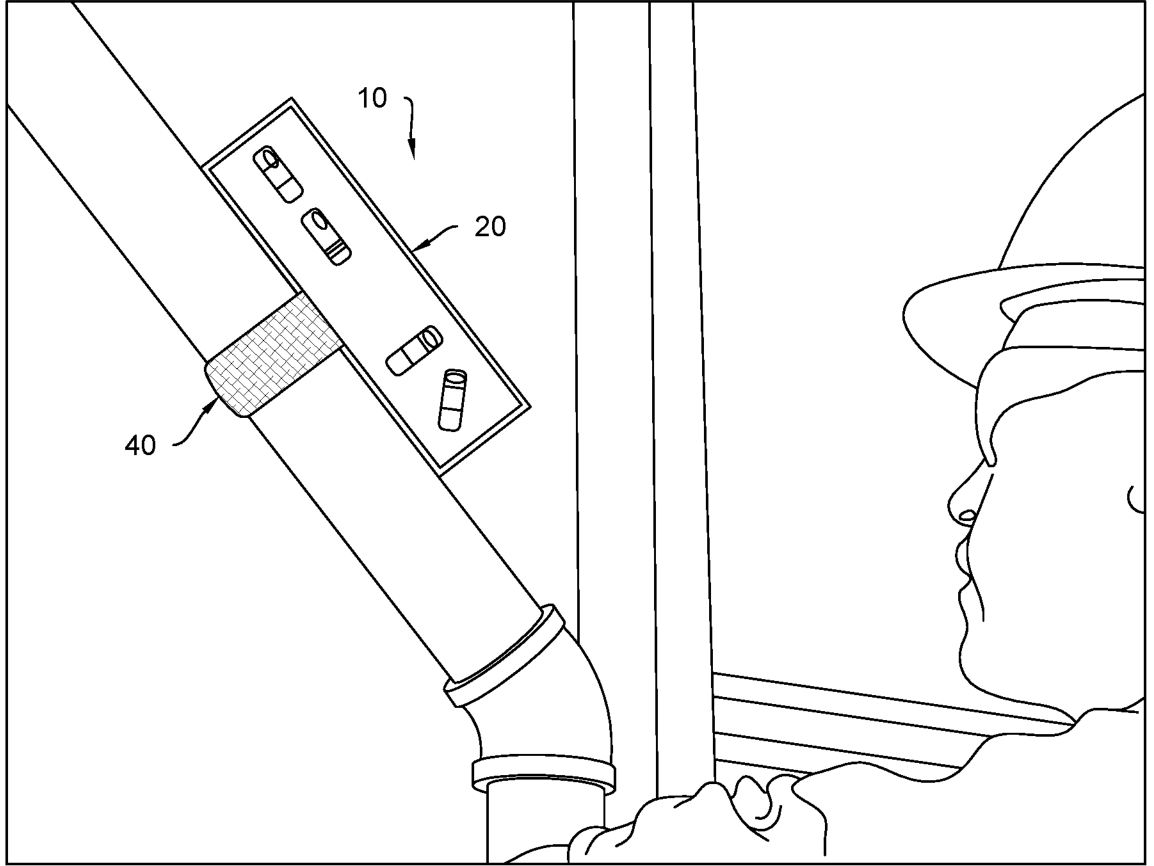
FIG. 1 represents an operational view of the present invention.

Referring now to the drawings, where the present invention is generally referred to with numeral 10, it can be observed that it basically includes a level assembly 20 and a fastening assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
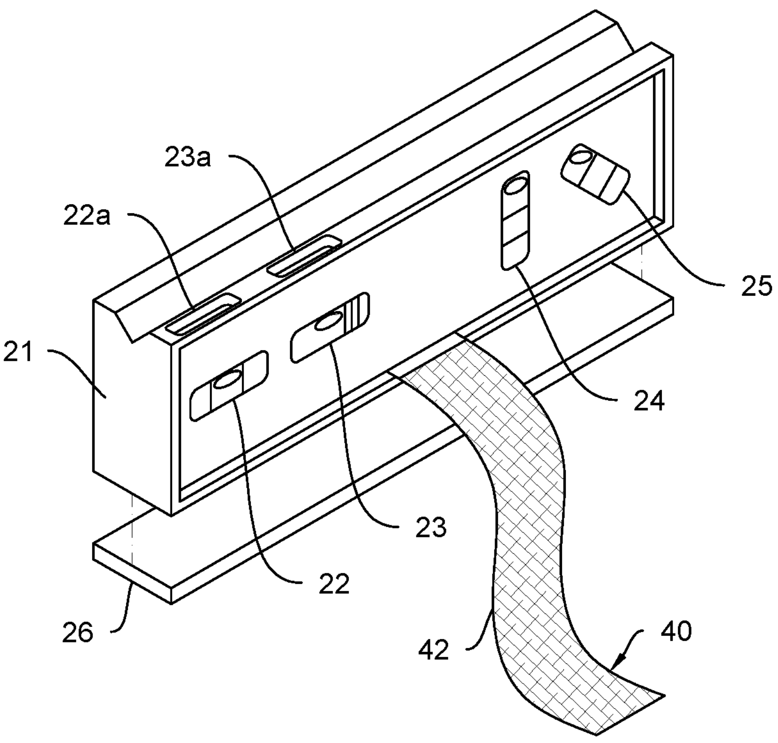
FIG. 2 shows a perspective exploded view of the present invention.
Figure 3A:
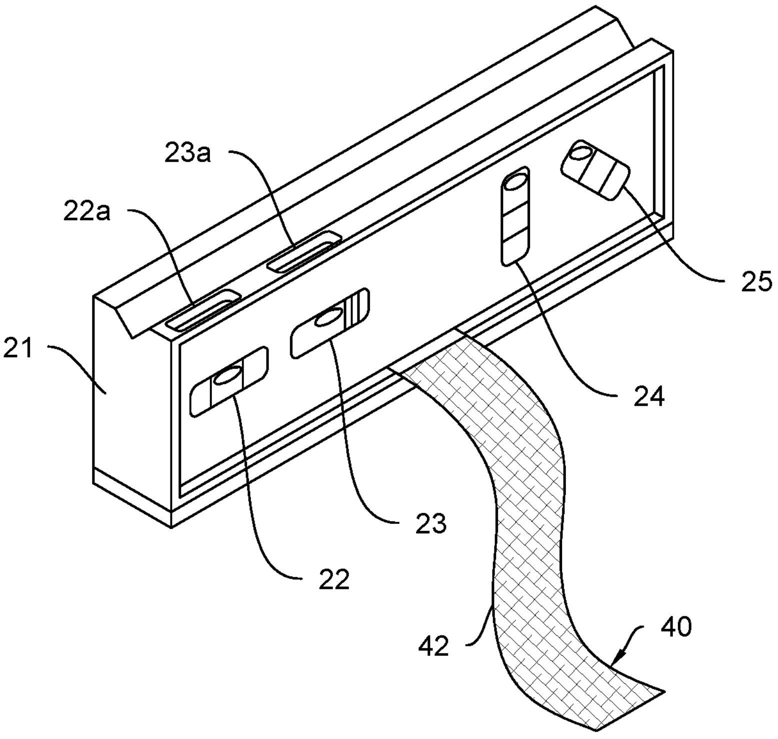
FIG. 3A illustrates an isometric view of the present invention.
Figure 3B:
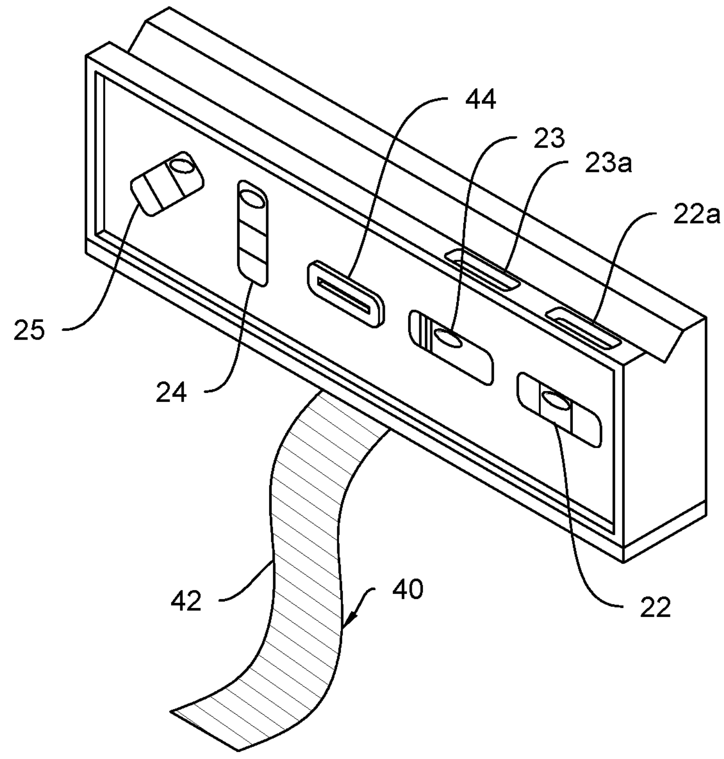
FIG. 3B is a representation of a perspective view of the present invention.

The level assembly 20 may be an elongated torpedo level which includes a body 21 with a plurality level spirits embedded therein. In one exemplary embodiment, the level body 21 may comprise an elongated body with a substantially rectangular cross-ssection. Nonetheless, in other embodiments, the geometry of the body 21 may vary to accommodate different operational requirements. The body 21 may be fabricated from lightweight and durable material, such as aluminum alloy, a reinforced polymer, or the like. On a top surface, the body 21 may include an elongated channel that crosses said body length-wise. The channel may have a V-shaped cross-section. A magnet strip 26 may be attached to a bottom surface of the body 21. Preferrably, the magnet strip 26 may have a geometry that conforms with the base of the body 21. As shown in FIG. 2-3B, the magnet strip 26 may have a rectangular shape. The magnet strip 26 may be attached thereto using different means as known in the art such as: adhesive backing, mechanical fasteners, or the like. The primary purpose of the magnetic strip 26 is to allow the body 21 to securely attach to ferrous magnetic surfaces. This is particularly useful when working with metal structured, such as steel beams or pipes. As said above, the body 21 may have level spirits embedded therein. In one exemplary embodiment, the level spirits may comprise a group of a horizontal level bubble 22, a grad level bubble 23, a vertical level bubble 24, and a 45 degree level bubble 25. It is worth noting that the aforementioned level bubbles are herein listed for explanatory purposes and should not be considered in a limiting sense. As shown in FIG. 3A-3B, the level spirits may be visible from both sides of the body 21. The horizontal level bubble 22 may be a transparent tube partially filled with a liquid, often colored for better visibility; inside the tube is an air bubble. The grad level bubble 22 may have the same characteristics of the horizontal level bubble 22 but including including graduations on the exterior for precise measurement. In one embodiment, both the horizontal level bubble 22 and the grad level bubble 23 may be set parallel to the body's base, allowing the air bubble to move freely along the length of the tube. In one embodiment, the horizontal level bubble 22 may be placed between the grad level bubble 23 and a lateral edge of the body 21. Consequently, both the horizontal level bubble 22 and the grad level bubble 23 may be proximal to each other. Similar to the horizontal level bubble 22, the vertical level bubble 24 may be a small, transparent tube partially filled with a liquid, typically with a colored tint for visibility. Within the tube is an air bubble, the vertical level bubble 24 may be set perpendicular to the horizontal level bubble 22, allowing the air bubble to move freely along the vertical axis. The 45-degree level bubble 25, also known as a diagonal or inclinometer bubble, may be a specialized component found in certain levels designed to measure angles at a 45-degree inclination. This type of level bubble may useful for tasks that require a specific angle or slope. The 45-degree level bubble shares similarities with the horizontal and vertical bubbles. It consists of a transparent tube partially filled with a liquid, often with a colored tint for better visibility. An air bubble within the tube responds to the inclination of the level. In one embodiment, the vertical level bubble 24 and the 45-degree kevel bubble 25 may be proximal to each other. The 45-degree kevel bubble 25 may be placed between the vertical level bubble 24 and an opposite lateral edge of the body 21. There may be a space between the grad level bubble 23 and the vertical level bubble 24 as depicted throughout the figures. Overall, the plurality level spirits may be horizontally aligned along the length of the body 21.

Figure 5:
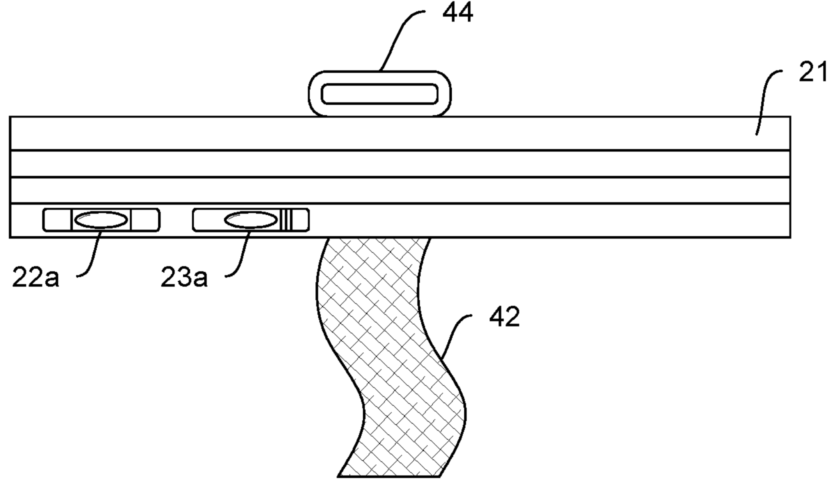
FIG. 5 shows a top planar view of the present invention.

The leveling device comprises two sight apertures (22*a* and 23*a*) positioned on the upper surface of the device's body. These apertures are in alignment with the horizontal level bubble 22, a grad level bubble 23, providing a top-down perspective for the observation of the level indicators, as depicted in FIG. 5.

The fastening assembly 40 may include a strap 42 and a loop 44 both attached to the body 21. The strap 42 may be attached to an opposite surface of the body relative to the loop 44 as depicted in FIG. 3A and FIG. 3B. This configuration allow the body to be placed upon a device, such as a PVC tube, permitting the strap to wrap up the tube to then be secured through the loop 44. The strap 42 may be made of a durable and flexible material such as nylon or reinforced fabric. A distal end of the strap may be attached to the body 21, whilst the opposite end of the strap 42 may be loose. The strap 42 may be attached to the body 21 at two or more points along its length, preferably near the ends thereof, to withstand tension and provide a secure connection. In a preferred embodiment, the strap 42 may be a hook and loop strap. The loop 44 may be made of a durable and resistant material. In one embodiment, the loop 44 may be anchored to the body 21. The loop 44 may be designed in a closed shape, forming a circle or oval that allows the strap to pass through. In one embodiment, the loop 44 may be placed in the space between the the grad level bubble 23 and the vertical level bubble 24. In a preferred embodiment, the strap 42 and the loop 44 may be aligned to facilitate straightforward attachment of the strap 42 to the loop 44. Especially because twisting of the strap 42 could lead to a loose or uneven connection, compromising the stability of the level assembly 20. In one embodiment, the strap 42 and the loop 44 may be placed along a central portion of the body 21.

Figure 4:
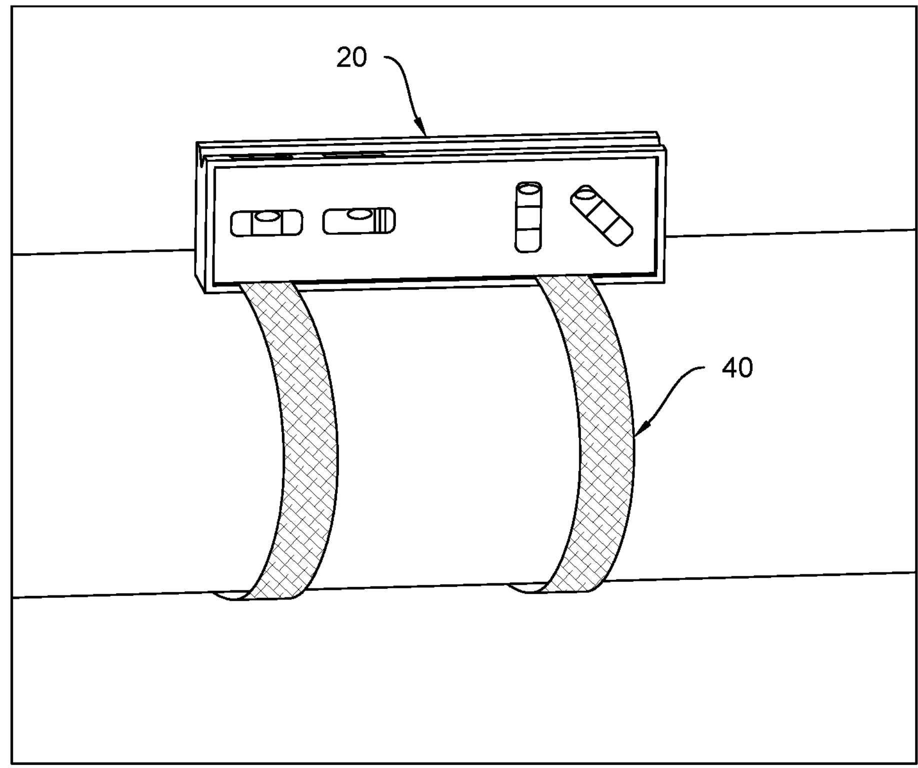
FIG. 4 shows an operational view of the present invention according to an alternative embodiment.

The exemplary embodiment shown in FIG. 4, shows an alternative configuration of the fastening assembly in which at least two straps are attached to the body 21 to enhance stability. Furthermore, multiple parallel straps may distribute the load evenly across the tube, reducing the risk of the level slipping or tilting. In this exemplary embodiment, the straps may be equidistant.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A leveling device, comprising:

a level assembly being an elongated torpedo level having a body with a plurality of embedded spirit levels, the plurality of embedded spirit levels comprising a horizontal level bubble, a grad level bubble, a vertical level bubble, and a 45-degree level bubble, wherein the horizontal level bubble and the grad level bubble are proximal to each other and the vertical level bubble and the 45-degree level bubble are proximal to each other, thereby creating a space between the grad level bubble and the vertical level bubble where for the loop to be attached thereto;

a fastening assembly including a hook and loop strap attached to a surface of the body by means of a proximal end of the strap and a loop attached to an opposite surface of the body, said hook and loop strap further includes a distal end to be attached to the loop; the hook and loop strap allows to temporary attach the leveling device to pipes and conduits during installation.

2. The leveling device of claim 1, wherein a magnet strip is attached to a bottom surface of the body.

3. The leveling device of claim 1, wherein the body has an elongated rectangular shape, and further includes a channel on a top surface, said channel has a V-shaped cross section, and said channel spans the length of the body.

4. The leveling device of claim 1, wherein the strap and the loop are both aligned at a central portion of the body to permit a straightforward attachment without twisting the strap, and wherein two sight apertures are positioned on an upper surface of the body, said apertures are in alignment with the horizontal level bubble and the grad level bubble.

5. A leveling device, consisting of:

an elongated torpedo level having a body, a plurality of spirit levels are embedded within said body and are aligned along a horizontal section of the body, said plurality of spirit levels consisting of a horizontal level bubble, a grad level bubble, a vertical level bubble, and a 45-degree level bubble;

at least one fastening attached to the body, wherein each fastening assembly includes:

a hook and loop strap attached to a surface of the body at a proximal end of the strap and a loop attached to an opposite surface of the body between the grad level bubble and the vertical level bubble, said hook and loop strap further includes a distal end to be attached to the loop, the loop is designed in a closed shape, forming a circle or oval that allows the strap to pass through; and wherein the hook and loop strap of each fastening assembly allows to temporary attach the leveling device to pipes and conduits during installation.

* * * * *